(12) United States Patent
Park et al.

(10) Patent No.: US 8,694,360 B2
(45) Date of Patent: Apr. 8, 2014

(54) SMART SERVER AND SMART DEVICE

(75) Inventors: Jong Soo Park, Bucheon-si (KR); Jong Hwa Song, Suwon-si (KR); Jong Ho Won, Seoul (KR); Woo Hyun Paik, Seoul (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 13/071,097

(22) Filed: Mar. 24, 2011

(65) Prior Publication Data

US 2011/0264605 A1  Oct. 27, 2011

(30) Foreign Application Priority Data

Apr. 21, 2010  (KR) .................. 10-2010-0036945

(51) Int. Cl.
*G06Q 10/00* (2012.01)
*G06Q 30/00* (2012.01)
*G06F 17/00* (2006.01)
*G06G 7/00* (2006.01)
*G06Q 30/02* (2012.01)

(52) U.S. Cl.
CPC .................................. *G06Q 30/0283* (2013.01)
USPC ........................................ 705/7.35; 705/400

(58) Field of Classification Search
CPC .................................. G06Q 30/0283
USPC .................................. 705/7.35, 400
See application file for complete search history.

(56) References Cited

U.S. PATENT DOCUMENTS

2002/0082747 A1 *  6/2002  Kramer ................... 700/276
2004/0181492 A1 *  9/2004  Rybakowski et al. .......... 705/63

* cited by examiner

*Primary Examiner* — Allen J Jung
(74) *Attorney, Agent, or Firm* — Birch, Stewart, Kolasch & Birch, LLP

(57) ABSTRACT

A smart server and smart device are disclosed, by which a new power unit price (hereinafter named a combined power unit price) can be calculated in consideration of an internally generated electricity quantity instead of using an external power unit price as it is. The present invention includes a power demand obtaining unit obtaining a home power demand for at least one electronic appliance including a smart device, a generated quantity detecting unit detecting an internally generated power quantity for at least one home generator, a price information receiving unit receiving power information including external power price information on an external power via a network, and a combined unit price output unit outputting a combined power unit price using an external power demand and the internally generated power quantity and the external power price information, wherein the external power demand is calculated based on the power demand.

16 Claims, 17 Drawing Sheets

External power demand (ED) = Power demand (TD) - Internally generated power quantity (IG)

Combined Power Unit (NP) = max $\left\{ \text{External Power Unit Price (EP)} \times \dfrac{\text{External Power Demand (ED)}}{\text{Power Demand (TD)}}, 0 \right\}$ where External Power Demand (ED) = Power Demand (TD) − Internally Generated Power Quantity (IG)

FIG. 14

| Receiver | Example | Reference for calculating differential power unit price | Example of differential power unit price |
|---|---|---|---|
| $1_{st}$ smart device (301) | Refrigerator | Calculate by assigning internally generated power quantity preferentially | 55 Won |
| $2_{nd}$ smart device (302) | Washer | Calculate by assigning internally generated power quantity finally | 100 Won |
| $M_{th}$ smart device (30M) | Air conditioner | Calculate by assigning internally generated power quantity equally | 85 Won |

SMART SERVER AND SMART DEVICE

This application claims the benefit of the Korean Patent Application No. 10-2010-0036945, filed on Apr. 21, 2010, which is hereby incorporated by reference as if fully set forth herein.

BACKGROUND OF THE INVENTION

1. Field of the Invention

The present invention relates to a technology for controlling a power automatically, and more particularly, to a smart server and smart device. Although the present invention is suitable for a wide scope of applications, it is particularly suitable for controlling a power based on electricity charges.

2. Discussion of the Related Art

Generally, such an electric appliance as a home appliance used at home, a business machine used at office and the like is supplied with power via a transmission line from a power plant. Meanwhile, regarding an externally supplied electricity, a power unit price, which is the charge per unit power (energy), may vary per time slot. Hence, electric charges per month (or per unit period) are calculated in a manner of applying the power unit price to a power consumption quantity per time slot.

In case that such an independent power generator as a solar power generator, a wind power generator and the like is installed at home, the internally generated electricity is preferentially used rather than the externally supplied electricity. Thus, in case that the internal electricity sufficient for a total power demand of home appliances is generated by the independent power generator, the demand for the externally supplied electricity is reduced or becomes zero.

When a power saving function is performed according to a power unit price for an externally supplied electricity (i.e., charges per unit power), a power saving mode or an ultra-power saving mode can be automatically entered in a time slot having a high external power unit price. If this function is performed, when the external electricity is not necessary due to the sufficient internally generated electricity, the power saving mode is in appropriately entered due to the high external power unit price even if actual electric charges of the external electricity are very small despite the high external power unit price.

SUMMARY OF THE INVENTION

Accordingly, the present invention is directed to a smart server and smart device that substantially obviate one or more problems due to limitations and disadvantages of the related art.

An object of the present invention is to provide a smart server and smart device, by which a new power unit price (hereinafter named a combined power unit price) can be calculated in consideration of an internally generated electricity quantity instead of using an external power unit price as it is.

Another object of the present invention is to provide a smart server and smart device, by which a power saving function can be automatically performed according to a power unit price in consideration of both an internally generated electricity quantity and an external electricity demand.

Another object of the present invention is to provide a smart server, by which an internally generated electricity quantity is differentially distributed according to priority instead of being equally distributed to a plurality of smart devices.

A further object of the present invention is to provide a smart server, by which smart devices are prevented from wasting power in performing a power control according to a combined power unit price in a manner of informing the smart device of a range of an electric power quantity to which a combined power unit price is applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a smart server according to the present invention includes a power demand obtaining unit obtaining a home power demand for at least one electronic appliance including a smart device, a generated quantity detecting unit detecting an internally generated power quantity for at least one home generator, a price information receiving unit receiving power information including external power price information on an external power via a network, and a combined unit price output unit outputting a combined power unit price using an external power demand calculated based on the power demand and the internally generated power quantity and the external power price information.

Preferably, the combined power unit price has a value increasing if the external power demand increases or the power demand decreases.

Preferably, the combined power unit price is calculated based on an external power dependency and wherein the external power dependency is a ratio of the power demand to the external power demand.

Preferably, if the external power demand is equal to or smaller than 0, the combined power unit price is 0.

Preferably, the power demand, the internally generated power quantity and the external power price information are received or obtained each time of a predetermined unit and the combined power unit price is calculated each time of the predetermined unit.

Preferably, if each of the power demand and the internally generated power quantity is an actually measured value corresponding to a current time, the combined power unit price corresponds to a real unit price. If each of the power demand and the internally generated power quantity is a predicted value corresponding to a future time, the combined power unit price corresponds to a predicted unit price.

Preferably, the smart server further includes a combined unit price output unit transmitting the combined power unit price to the at least one smart device.

In another aspect of the present invention, a smart device includes a demand obtaining unit obtaining a power demand for at least one electronic appliance, a generated quantity receiving unit receiving an internally generated power quantity for at least one home generator, a price information receiving unit receiving external power price information on an external power via a smart grid, a combined unit price calculating unit calculating a combined power unit price using an external power demand resulting from subtracting the internally generated power quantity from the power demand and the external power price information, and a power control unit performing a power control based on the combined power unit price.

Preferably, the combined power unit price has a value increasing if the external power demand increases or the power demand decreases.

Preferably, the combined power unit price is calculated based on an external power dependency and wherein the external power dependency is a ratio of the power demand to the external power demand.

Preferably, if the external power demand is equal to or smaller than 0, the combined power unit price is 0.

Preferably, the power demand, the internally generated power quantity and the external power price information are received or obtained each time of a predetermined unit and the combined power unit price is calculated each time of the predetermined unit.

Preferably, if each of the power demand and the internally generated power quantity is an actually measured value corresponding to a current time, the combined power unit price corresponds to a real unit price. If each of the power demand and the internally generated power quantity is a predicted value corresponding to a future time, the combined power unit price corresponds to a predicted unit price.

Preferably, the smart device further includes a power control unit performing a power control based on the combined power unit price.

Preferably, the smart device further includes a combined unit price output unit transmitting the combined power unit price to another smart device.

In another aspect of the present invention, a smart server, which performs a power saving function by being connected to a smart grid, includes an external power information receiving unit receiving external power information including price information of an external power via a network, a home power information receiving unit receiving a home generated power quantity and home power demand information, and a power information correcting/outputting unit correcting to output the external power information based on the received external power information and the received home power information.

In a further aspect of the present invention, a smart device, which performs a power saving function by being connected to a smart grid, includes an external power information receiving unit receiving external power information including price information of an external power via a network, a home power information receiving unit receiving a home generated power quantity and home power demand information, and a power information correcting/outputting unit correcting to output the external power information based on the received external power information and the received home power information.

Accordingly, the present invention provides the following effects and/or advantages.

First of all, in case that a generated quantity of an internal power is sufficient for a total power demand, a power saving mode is prevented from being inappropriately entered. Therefore, the present invention enables a home appliance or an electrical appliance to be operated with integrity according to a user command.

Secondly, as a generated quantity of an internal power is very small, if a total power demand becomes equal to an external power demand, the present invention enables a power saving function to be automatically performed based on an external power unit price.

Thirdly, if a smart server calculates a combined power unit price and then delivers the calculated unit price to smart devices, although mechanism of the smart devices is not changed, the present invention enables each of the smart devices to automatically perform a power saving function according to the combined power unit price.

Fourthly, since an electricity charge generated fro applying an external power unit price to an external power demand is equal to an electricity charge generated from applying a combined power unit price to a total power demand, the present invention is able to predict an actual payment of electricity charges using the combined power unit price.

Fifthly, the present invention calculates a differential combined unit price different per smart device and then transmits the calculated unit price. Therefore, the present invention differentially distributes an internally generated power quantity according to a priority of each smart device.

Sixthly, the present invention differentially distribute an internally generated power quantity according to a priority of each smart device so that a smart device having a low priority controls a power in a manner of being sensitive to a power unit price. Therefore, the present invention can efficiently distribute the internally generated power quantity per device.

Seventhly, the present invention informs a smart device of both a combined power unit price and a range of a power quantity to which a combined power unit price is applied, thereby preventing the smart device from misunderstanding that the combined power unit price is cheap. Therefore, the corresponding power can be prevented from being excessively consumed over an estimated power quantity.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 14 is a table for examples of a differential combined power unit price according to a third embodiment of the present invention;

DETAILED DESCRIPTION OF THE INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

Figure 1:
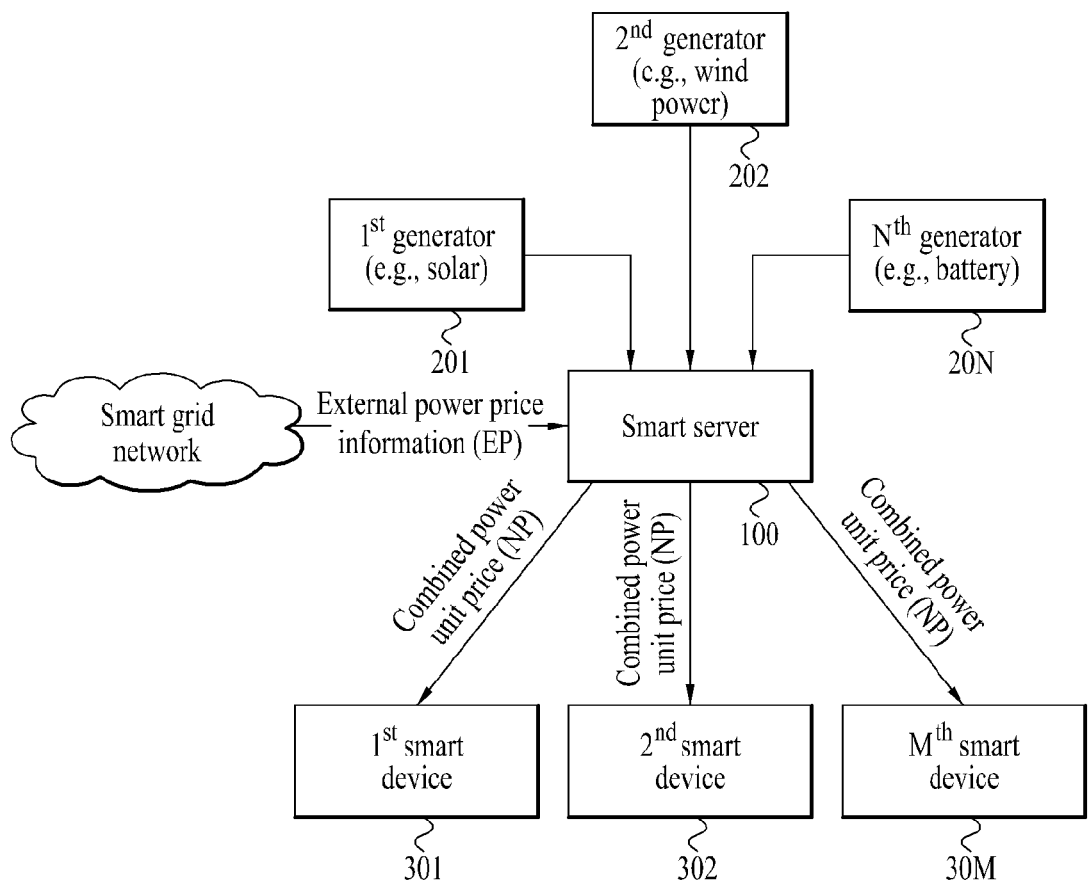
FIG. 1 is a block diagram of a smart server and peripheral devices according to a first embodiment of the present invention.

FIG. 1 is a block diagram of a smart server and peripheral devices according to a first embodiment of the present invention.

Referring to FIG. 1, a smart server 100 according to a first embodiment of the present invention is connected to a network (e.g., a smart grid network) and is also connected to at least one or more internal generators (i.e., first to $N^{th}$ generators 201 to 20N) installed at home and at least one or more smart devices (i.e., first to $M^{th}$ smart devices 301 to 30M).

In this case, the smart grid or the smart grid network is a data communication network for power to exchange real-time information between a consumer and an electric power company by combining a power network with IT technology. In particular, a smart grid of the present invention corresponds to a network for providing a real-time price signal, and more particularly, price information (i.e., an external price (EP) on an external power or electricity. According to the present invention, since a power generated at home exists as well as a power externally provided by an electric power company, the power provided by the electric power company shall be simply named an external power and the power generated from the home power generation shall be named an internal power. The price information (EP) on the external power, i.e., the external power price information (EP) can include a price per unit power quantity for each time slot, i.e., an external power unit price. In this case, a unit of the external power unit price can include one of monetary unit/kilowatt hour (kwh) (e.g., won/kwh, dollar/kwh ($/kwh), etc.), monetary unit/J, monetary unit/Kcal and the like. Thus, by applying the external power unit price per specific time slot to a used quantity of the external power during a specific period, it is able to calculate or compute a power charge or price paid for the specific period.

Meanwhile, although the smart server 100 can be installed at home, it can be installed at an external data center to perform the above-mentioned operations by clouding computing. For instance, programs or data necessary for the operations are stored in a database of a data center accessible via Internet and can be then accessed via application programs.

The home generator or the internal generator (e.g., the first to $N^{th}$ generators 201 to 20N) includes the generator independently installed at apartment, house, building or the like. For instance, the home or internal generator can include one of a solar generator, a wind power generator and the like, by which the present invention is non-limited. Meanwhile, the internal generator 20N can include a battery that generates electricity by discharging the charged electricity. As mentioned in the foregoing description, the power generated by the home generator shall be named an internal power.

Meanwhile, the smart device 30M is a device configured to perform a power saving function according to a real-time price signal. And, the smart device can include such an electrical product as a washer, a refrigerator, an air conditioner or such a business machine as a printer, an all-in-one and the like. Moreover, the smart device is non-limited by specific electronic products of the present invention.

Meanwhile, the smart server 100 receives the external power price information (EP) from the smart grid, receives an internal power output from each of the at least one or more home generators 201 to 20N, and obtains a total power demand of electronic home appliances including the smart devices 301 to 30M. the smart server 100 calculates a combined power unit price (NP) based on the received informations and then delivers the calculated price to each of the smart devices 301 to 30M. This shall be described in detail with reference to FIGS. 2 to 5 later in this disclosure.

Figure 2:
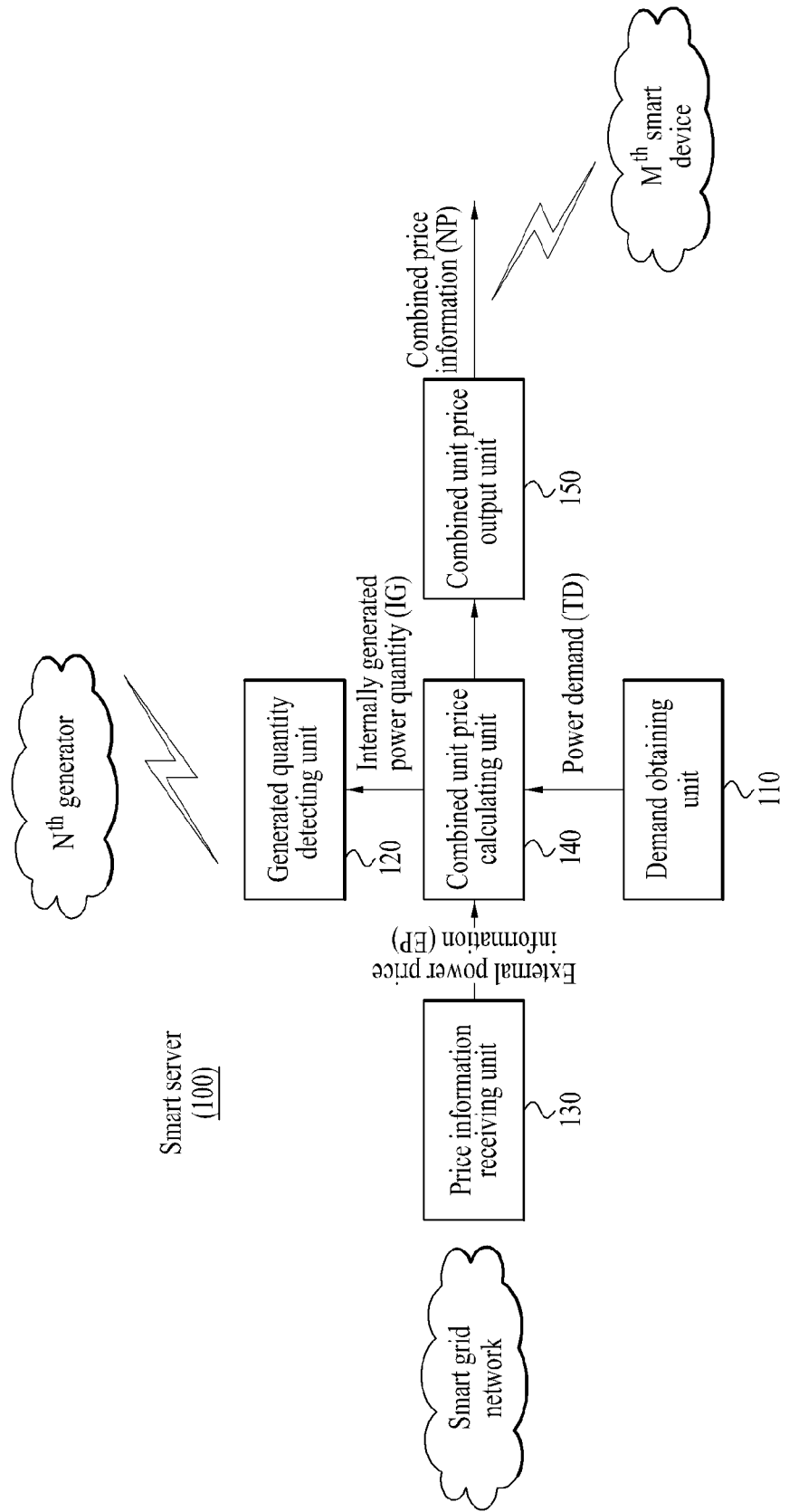
FIG. 2 is detailed block diagram of a smart server according to a first embodiment of the present invention.
Figure 3:
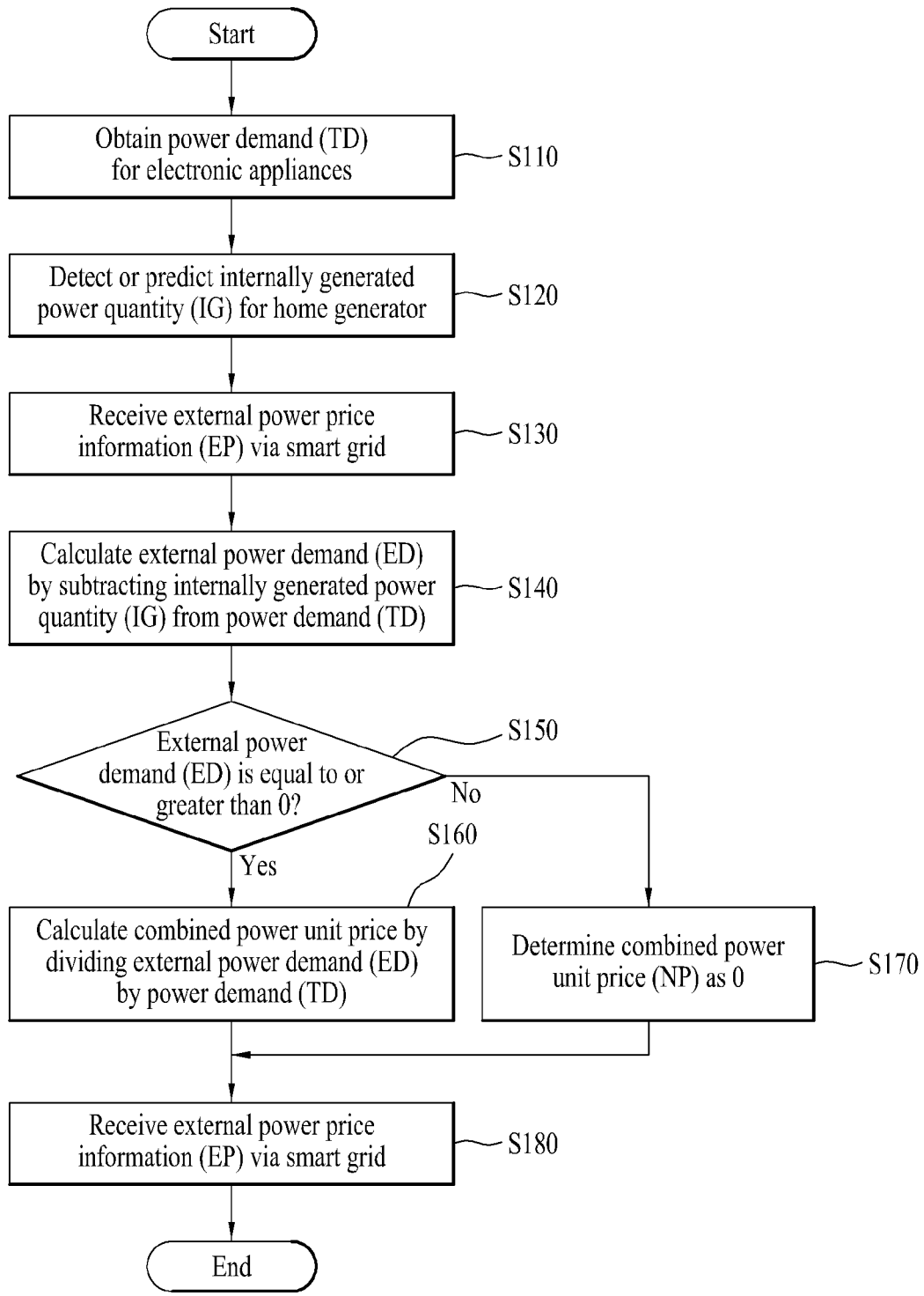
FIG. 3 is a flowchart for a method of calculating a power unit price in a smart server according to a first embodiment of the present invention.

FIG. 2 is detailed block diagram of a smart server according to a first embodiment of the present invention, and FIG. 3 is a flowchart for a method of calculating a power unit price in a smart server according to a first embodiment of the present invention.

Referring to FIG. 2, a smart server 100 according to a first embodiment of the present invention includes a demand obtaining unit 110, a generated quantity detecting unit 120, a price information receiving unit 130 and a combined unit price calculating unit 140 and is able to further include a combined unit price output unit 150. In the following description, functions of the components of the smart server 100 and steps of a method of calculating a price in the smart server 100 are explained with reference to FIG. 2 and FIG. 3.

First of all, the demand obtaining unit 110 obtains a total power demand (RD) of electronic devices [S110]. In this case, as mentioned in the foregoing description, the electronic devices include all electronic products, which consume powers by being installed at home or office, as well as the smart devices 301 to 30M. In this case, the total power demand (TD) is an actually measured value corresponding to a current time or a predicted value corresponding to a future time. In case of the actually measured value, the total power demand (TD) can include a value received from a smart meter (not shown in the drawing) capable of measuring a power consumption of all electronic devices. In case of the predicted value corresponding to the future time, the total power demand (TD) can include a value estimated based on data of a power consumption of each device. In this case, the data of the device power consumption is a predicted power consumption per device type, function, season or the like. The data of the device power consumption may correspond to a past used power quantity history data or a data provided by a manufacturer.

Figure 4:
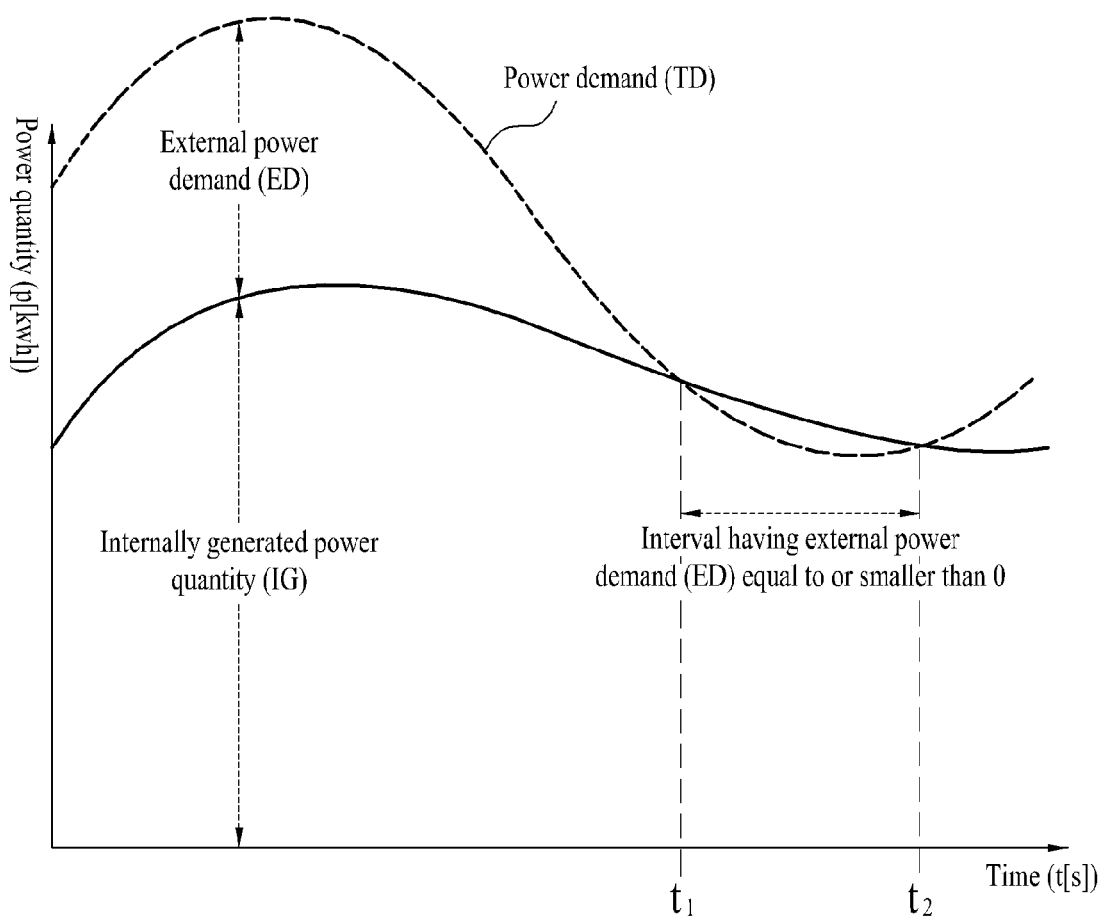
FIG. 4 is a graph for describing the concept of an internally generated power quantity and an external power demand.

FIG. 4 is a graph for describing the concept of an internally generated power quantity and an external power demand.

Referring to FIG. 4, a power demand (TD) is indicated by a doted line. In this case, the power demand (TD) is not a value fixed according to a time (t) but a value varying according to a time (t). The power demand (TD) obtained by the demand obtaining unit 110 can include a value that varies by a unit of a specific time (e.g., 1 second, 10 seconds, 5 minutes, 10 minutes, etc.).

The generated quantity detecting unit 120 detects or predicts an internally generated power quantity (IG: internal generation) of a power internally generated by at least one home generator [S120]. When a plurality of generators exist, the internally generated power quantity (IG) can correspond to a total power quantity of powers generated by the generators. For instance, the internally generated power quantity (IG) can correspond to a total power quantity resulting from assign a generated power quantity by a solar generator, a generated power quantity by a wind power generator and a discharged quantity of a battery together. If the internally generated power quantity (IG) is an actually measured value corresponding to a current time, it can include a value estimated based on a data of power generations of each generator. In this case, the data of the power generation of each generator is a data for predicting a generated power quantity per generator type, date, season, time slot or the like. This data corresponds to a past generated power quantity history data or can correspond to a data of natural environment (e.g., wind speed, amount of sunshine, etc.). In case of the battery, data of charging/discharging capacity can be included in the internally generated power quantity (IG).

Referring to FIG. 4, the internally generated power quantity (IG) is indicated by a solid line. Lie the power demand (TD) mentioned in the foregoing description, the internally generated power quantity (IG) is a value varying according to a time (t) and can include a value varying by a unit of a predetermined time (e.g., 1 second, 5 minutes, 10 minutes, etc.).

Referring to FIG. 4, an external power demand (ED) becomes a difference amounting to a quantity indicated by a solid line in the power demand (TD) indicated by the dotted line. Yet, in the interval between t1 and t2, the internally generated power quantity (IG) is greater than the power demand (TD). In this case, the external power demand (ED) has a value equal to or smaller than 0. In particular, since a power quantity remaining after use exists, it is able to sell the remaining power quantity to an external power company.

The rest of the components and steps are described with reference to FIG. 2 and FIG. 3 as follows.

The price formation receiving unit 130 receives the external power price information (EP) from a smart grid or the like [S130]. As mentioned in the foregoing description with reference to FIG. 1, the external power price information (EP) can include an external power unit price (i.e., a price per unit power quantity) varying per time. The external power price information (EP) can be received by one of PCL (power line communication), IP (internet protocol) and the like, by which the present invention is non-limited.

Figure 5:
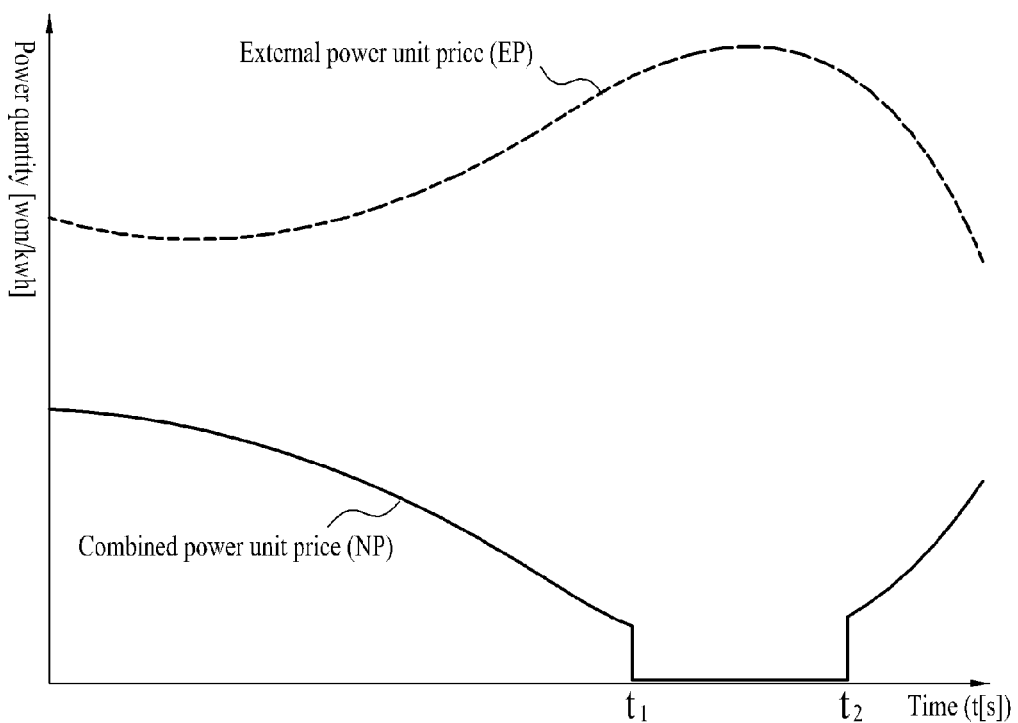
FIG. 5 is a graph for describing a progress of a combined power unit price according to an embodiment of the present invention.

FIG. 5 is a graph for describing a progress of a combined power unit price according to an embodiment of the present invention.

Referring to FIG. 5, an external power unit price (EP) varying per slot of time (t) is indicated by a solid line. In this case, the external power unit price (EP) can include a value varying by a unit of specific time (e.g., 1 second, 5 minutes, 10 minutes, etc.) as well.

Meanwhile, the aforesaid steps S110 to S130 are just described in order for convenience. It is not mandatory to perform the steps S110 to S130 in order. Alternatively, the steps S110 to S130 can be performed simultaneously or irrespective of the order.

The combined unit price calculating unit 140 calculates a combined power unit price using the power demand (TD) obtained in the step S110, the internally generated power quantity predicted in the step S120 and the external power price information (EP) received in the step S130 [S140 to S170].

In particular, the combined unit price calculating unit 140 determines an external power demand (ED) by the following formula using the power demand (TD) and the internally generated power quantity (IG) [S140].

External Power Demand($ED$)=Power Demand($TD$)−
Internally Generated Power Quantity($IG$)     [Formula 1]

The internally generated power quantity (IG) can be greater or smaller than the power demand (TD). Referring to FIG. 4, the internally generated power quantity (IG) is smaller than the power demand (TD) in the interval between 0 and $t_1$. And, the internally generated power quantity (IG) is greater than the power demand (TD) in the interval equal to or greater than $t_2$. For instance, the interval between t1 and t2 can correspond to the interval having a sufficient amount of sunshine or a high wind speed.

Thus, since it is necessary to use an externally supplied power amounting to the difference between the internally generated power quantity (IG) and the power demand (TD), the external power demand (ED: external demand) depends on the internally generated power quantity (IG) and the power demand (TD), as shown in the following formula.

Subsequently, if the external power demand (ED) is equal to or greater than 0 ['Yes' in the step S140], the combined unit price calculating unit 140 calculates a combined power unit price (NP: new price or CP: combined price) in a manner of dividing the external power demand (ED) by the power demand (TD) and then applying the corresponding result to the external power price (EP) [S160].

Combined Power Unit Price($NP$)=External Power
Unit Price($EP$)×External Power Demand($ED$)/
Power Demand($TD$), where External Power
Demand($ED$)=Power Demand($TD$)−Internally
Generated Power Quantity($IG$).     [Formula 2]

For instance, if the power demand (TD) is 100 kwh, the internally generated power quantity (IG) is 15 kwh, and the external power unit price (EP) is 100 won/kwh, the combined power unit price (NP) is '100 won/kwh×(100 kwh−15 kwh)/100 kwh=100 won/kwh×0.85=85 won/kwh'.

In particular, 'the external power demand (ED) versus the power demand (TD)' (i.e., external power demand (ED)/power demand (TD)) has a value ranging between 0 and 1 in general or occasionally has a negative value, it can be called an external power demand ratio. Since the external power unit price (EP) is multiplied by the external power demand rate, 'the external power demand (ED) versus the power demand (TD)' can be regarded as a substantially accepted ratio over the external power unit price (EP). In case of the former example, the substantially accepted ratio for the external power demand ratio and the external power unit price (EP) is 0.85. Hence, the combined power unit price (NP) becomes 85 won/kwh, whereas the external power unit price (EP) is 100 won/kwh. In particular, when the total power demand is 100, since 15% of the total power demand is the internal power, the internal power unit price corresponding to 15% is 0. Hence, 85% of the external power unit price is accepted.

On the contrary, if the external power demand (ED) is equal to or smaller than 0 ('no' in the step S140), the combined unit price calculating unit 140 determines the combined power unit price (EP) as 0 [S170]. When the combined power unit price (EP) has a negative value, if the negative value is delivered to the smart device as it is, the smart device may not be able to understand the meaning. Therefore, the combined power unit price (EP) is set to 0 won/kwh that is the concept of a lowest price.

For clarity and convenience, the steps S140 to S170 and Formula 1 and Formula 2 are individually explained. Yet, the combined power unit price (EP) can be calculated by such a single step as Formula 3.

Combined Power Unit(*NP*)=max{External Power Unit Price(*EP*)×External Power Demand(*ED*)/Power Demand(*TD*), 0}, where External Power Demand(*ED*)=Power Demand(*TD*)−Internally Generated Power Quantity(*IG*), and where max (*a*,*b*) indicates a higher one of a and b. [Formula 3]

According to the max operator, if the external power demand (ED) has a negative value, the combined power unit price (NP) has a lowest value, i.e. 0.

In the following description, the progress of the combined power unit price (NP) is explained in detail with reference to FIG. 4 and FIG. 5.

First of all, referring to FIG. 4, the internally generated power quantity (IG) gradually increases from 0 to a middle part in the interval between 0 to t1 but the external power demand (ED) is maintained at a similar level. Hence, the external power demand (ED) versus the internally generated power quantity (IG), i.e., the aforesaid external power demand ratio), gradually decreases. Referring to FIG. 5, the external power unit price (EP) is maintained at a similar level from 0 to a middle part in the interval between 0 and t1. Hence, in aspect of combination, since the external power demand ratio gradually decreases and the external power unit price (EP) is similarly maintained, the combined power unit price (NP) decreases from 0 to the middle part in the interval between 0 to t1.

After the middle part between 0 and t1, the external power demand ratio gradually decreases but the external power unit price (EP) weakly increases. Hence, the combined power unit price (NP) weakly decreases.

Meanwhile, in the interval between t1 and t2, as the internally generated power quantity (IG) precedes the power demand (TD), the external power demand ratio is 0. Hence, the combined power unit price (NP) becomes 0.

The combined unit price calculating unit 140 calculates the combined power unit price (NP) by the steps S140 to S170. Each of the internally generated power quantity (IG), the power demand (TD) and the external power unit price (EP) is the data, which can be changed or generated each time of a predetermined unit, and can be updated according to update periodicity. Therefore, the step of calculating the combined power unit price (NP) can be repeatedly performed each periodically according to the updated information.

Meanwhile, in case that each of the power demand (TD) and the internally generated power quantity (IG) is an actually measured value corresponding to a current time, the combined power unit price (EP) corresponds to an actual unit price. In case that each of the power demand (TD) and the internally generated power quantity (IG) is a predicted value corresponding to a future time, the combined power unit price (EP) corresponds to a predicted unit price.

The combined unit price output unit 150 transmits the combined power unit price (NP) to the at least one or more smart devices 301 to 30M [S180].

Afterwards, as mentioned in the foregoing description with reference to FIG. 1, each of the smart devices 301 to 30M performs a power saving function based on the combined power unit price (NP). For instance, if the combined power unit price (NP) is high, the corresponding smart device enters a power saving mode. If the combined power unit price (NP) is relatively low, the corresponding smart device can operate in a manual mode.

Each of the smart devices 301 to 30M receives a power unit price and then performs the power saving function only based on the received power unit price. And, it is unnecessary for the corresponding smart device to know whether the power unit price is an actual external power unit price (EP) or a combined power unit price (NP) of the present invention. Therefore, without changing a conventional algorithm of a smart device, the objects and effects of the present invention can be achieved by operations of a smart server according to an embodiment of the present invention.

The major objects and effects of the present invention are described again as follows. First of all, in case that an external power unit price (EP) is considerably high (e.g., a peak time), if the external power unit price (EP) is delivered to each of the smart devices 301 to 30M as it is, each of the smart devices 301 to 30M) unreasonably operates in the power saving mode despite using an external power barely (due to a considerably high internal power generation). Yet, if the combined power unit price (NP) is calculated by applying the external power demand ratio (or an external power dependency) to the external power unit price (EP) and is then delivered to each of the smart devices 301 to 30M), the corresponding smart device does not operate in the power saving mode but can be operated according to a request made by a user in an interval for using an external power barely despite a peak time.

Meanwhile, a smart server according to the present invention is not construed as limited to its terminology but can include every device, product, device or the like, which specifically has the combined unit price calculating unit 140 among the components described with reference to FIG. 2. In this case, the smart server is implemented as a general independent device or can be implemented in a manner of being loaded on such an electronic appliance as a washer, a refrigerator and the like.

Figure 6:
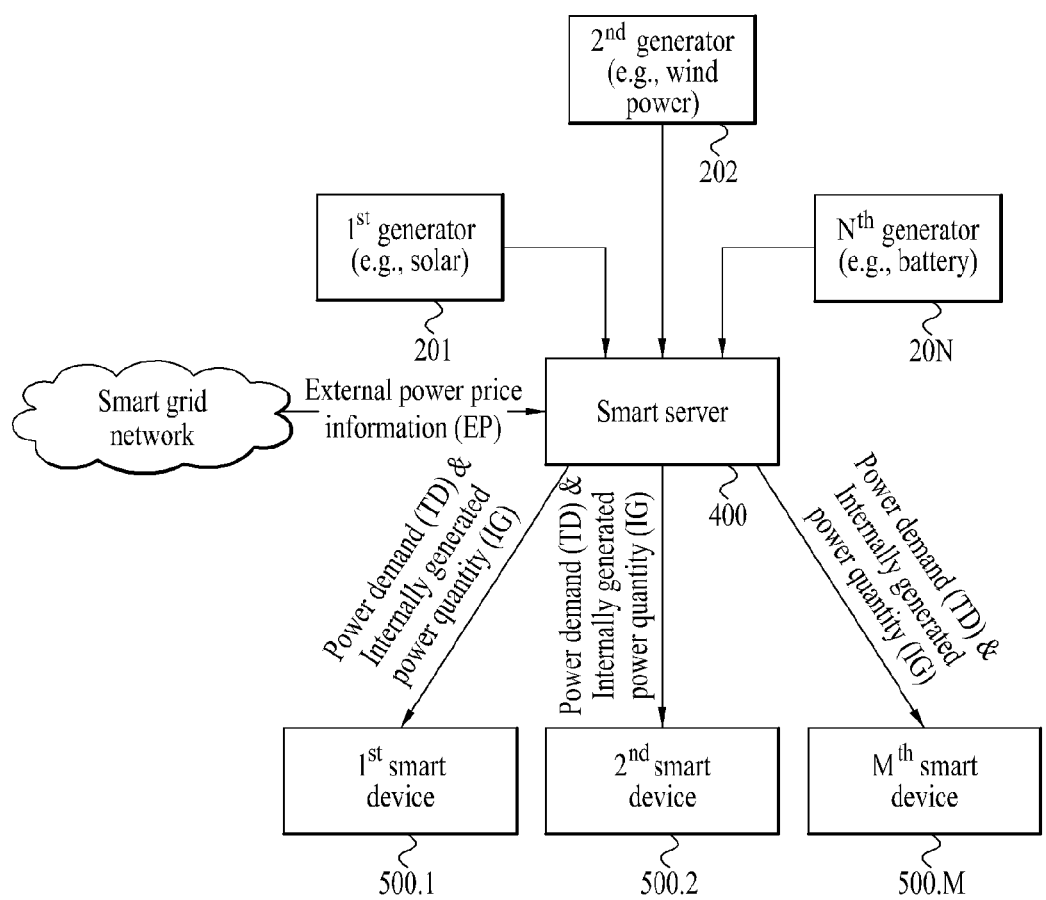
FIG. 6 is a block diagram of smart devices and peripheral devices according to a first embodiment of the present invention.
Figure 7:
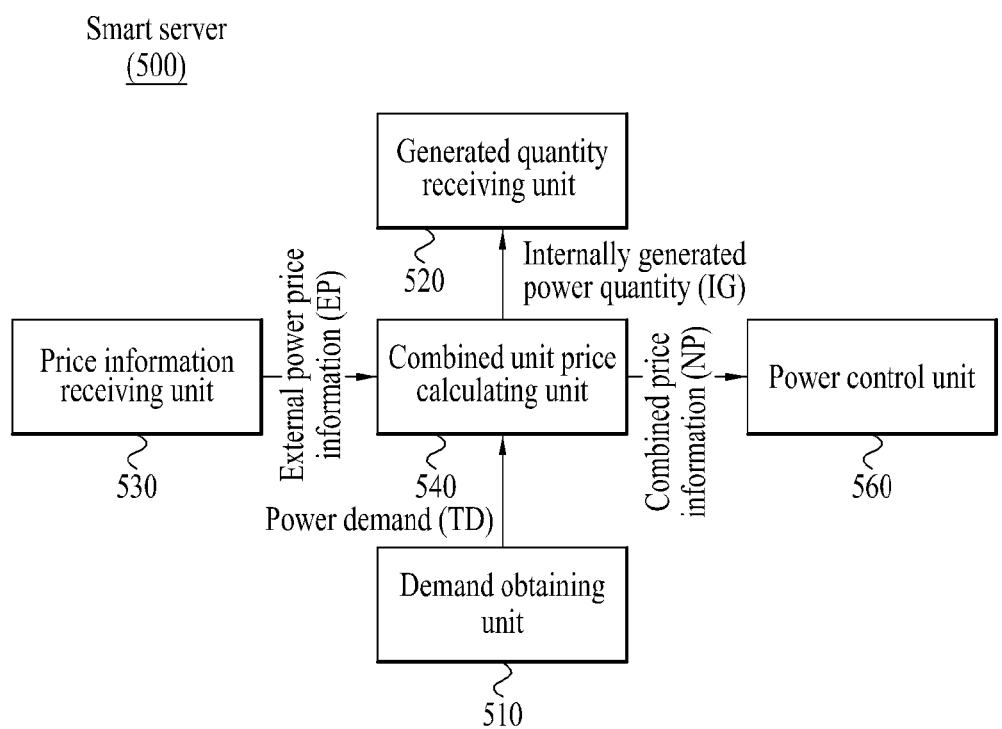
FIG. 7 is detailed block diagram of a smart device according to a first embodiment of the present invention.
Figure 8:
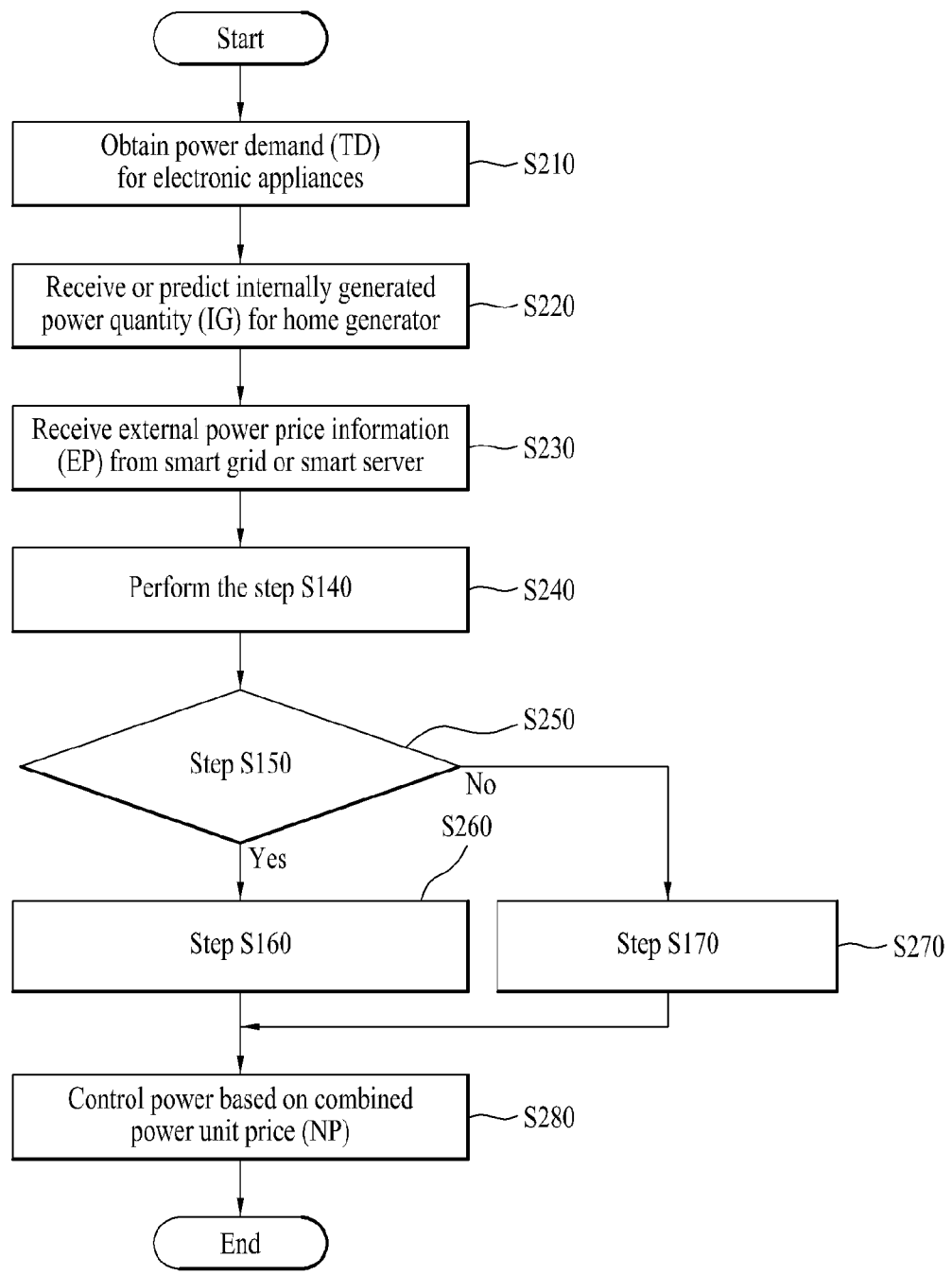
FIG. 8 is a flowchart for a method of controlling a power in a smart device according to a first embodiment of the present invention.

In the following description, explained with reference to FIGS. 6 to 8 is an example that the combined power unit price (NP) is calculated not by the smart server but by the smart device.

FIG. 6 is a block diagram of smart devices and peripheral devices according to a first embodiment of the present invention, FIG. 7 is detailed block diagram of a smart device according to a first embodiment of the present invention, and FIG. 8 is a flowchart for a method of controlling a power in a smart device according to a first embodiment of the present invention.

Referring to FIG. 6, each of smart device 500.1 to 500.M receives a power demand (TD) or an internally generated power quantity (IG) from a smart server 400 and also receives an external power price information (EP) via a smart grid directly or the smart server 400. As mentioned in the foregoing description with reference to FIGS. 1 to 3, the smart server 400 obtains a total power demand (TD) of electronic devices or appliances. Yet, the smart server 400 delivers the power demand (TD) to the at least one smart device 5001.1 rather than use the power demand for itself.

The smart server 400 is connected to at least one or more home generators 201 to 20N. The smart server 400 detects an internally generated power quantity (IG) and is then able to deliver the detected internally generated power quantity (IG) to the at least one smart device 500.1.

The smart server 400 receives the external power price information (EP) via a smart grid network and then delivers the received information to the at least one smart device 50.1 and the like as it is.

Meanwhile, as mentioned in the foregoing description, the smart server 400 is installed at home. Alternatively, the smart server 400 is installed at an external data center and is then able to perform the above operations.

In the following description, explained with reference to FIG. 7 and FIG. 8 are function of each detailed component of the at least one smart device 500.1 and steps included a power controlling method performed by the smart device.

Referring to FIG. 7, the smart device 500 includes a demand obtaining unit 510, a generated quantity receiving unit 520, a price information receiving unit 530 and a combined unit price calculating unit 540 and is able to further include a power control unit 560.

First of all, the demand obtaining unit 510 obtains a power demand (TD) for at least one electronic device [S210]. The demand obtaining unit 510 is able to obtain the power demand by the same method used by the former demand obtaining unit 110 of the smart server 100 described with reference to FIG. 2. In case that a smart server obtains a power demand (TD) by this method instead of a smart device, it is able to obtain a power demand (TD) by receiving it from the smart server.

The generated quantity receiving unit 520 receives or predicts an internally generated power quantity (IG) for a home generator [S220]. In particular, in case that the smart server 400 includes the generated quantity detecting unit 120 of the smart server 100 described with reference to FIG. 2, the internally generated power quantity (IG) can be received from the smart server 400. Alternatively, the generated quantity receiving unit 520 is able to predict the internally generated power quantity (IG) by the predicting method of the aforesaid generated quantity detecting unit 120.

The price information receiving unit 530 directly receives an external power price information (EP) from a smart grid or receives an external power price (EP) via the smart server 400 [S230].

Like the former combined unit price calculating unit 140 described with reference to FIG. 2, the combined unit price calculating unit 540 calculates a combined power unit price (NP) by performing the aforesaid steps S140 to S170 [S240 to S270]. In this case, the combined power unit price (NP) can be delivered to the power control unit 560 or can be transmitted to other smart devices 5001 to 500M via a combined unit price output unit (not shown in the drawing).

The power control unit 560 performs a power saving function based on the combined price information (NP). In particular, the power control unit 560 performs the power saving function in an interval having a high combined price information (NP). The power control unit 560 is able to release the power saving function in an interval having a relatively low combined price information. If so, the power control unit 560 is able to release the power saving mode in case of a low dependency rate on an external power in consideration of an internally generated quantity versus a total power demand of smart devices and the like despite a peak time having a high external power unit price (EP).

Figure 9:
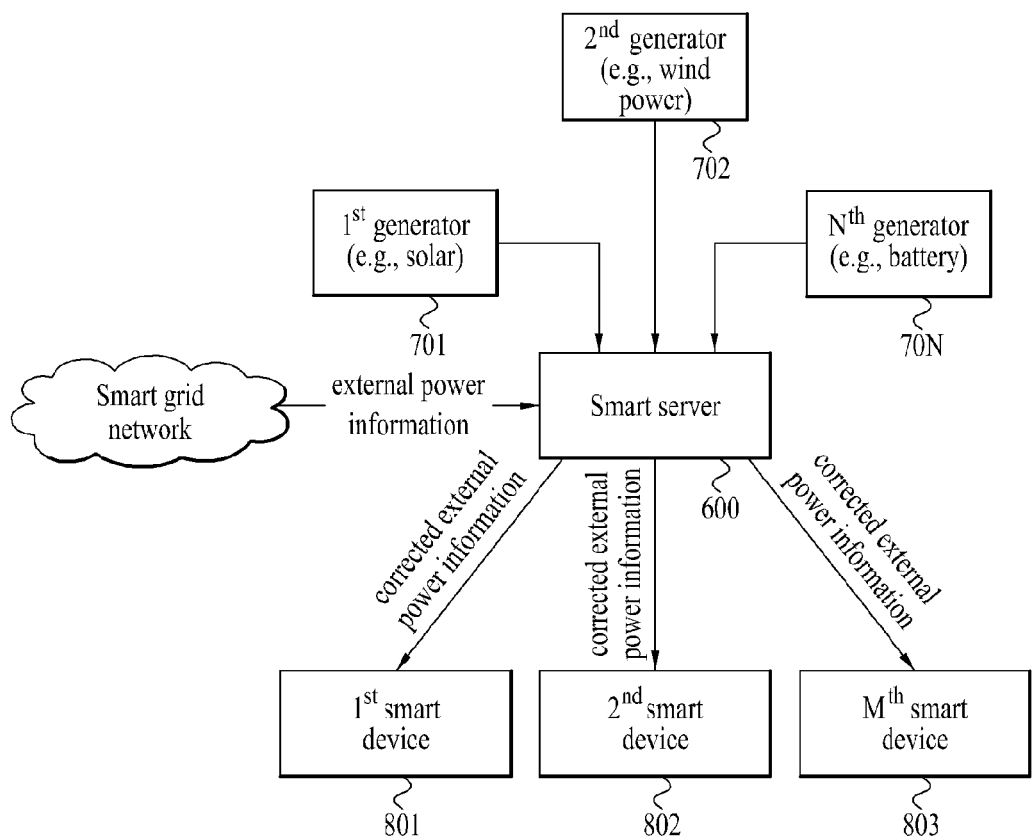
FIG. 9 is a block diagram of a smart server and peripheral devices according to a second embodiment of the present invention.
Figure 10:
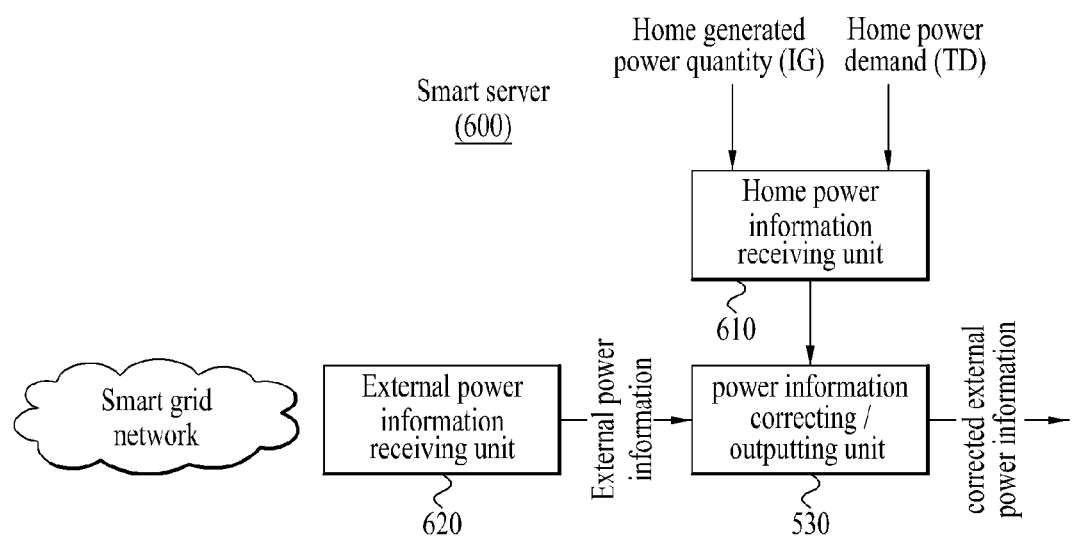
FIG. 10 is detailed block diagram of a smart server according to a second embodiment of the present invention.

FIG. 9 is a block diagram of a smart server and peripheral devices according to a second embodiment of the present invention, and FIG. 10 is detailed block diagram of a smart server according to a second embodiment of the present invention.

Referring to FIG. 9, like the smart server 100 according to the first embodiment of the present invention shown in FIG. 1, a smart server 600 according to a second embodiment of the present invention is connected to a network and is also connected to at least one or more home generators 701, 702 and 70N and at least one or more smart devices 801 to 803 via wire/wireless communication network.

Yet, the smart server 600 differs from that of the former embodiment shown in FIG. 1 in receiving external power information including external power price information (EF), correcting the external power information based on external power information and home power information and then delivering the corrected external power information (CEP) to the at least one or more smart devices 801 to 803.

Meanwhile, as mentioned in the foregoing description with reference to FIG. 1, the smart server 600 is installed at home or can be installed at an external data center to perform the above operation by clouding computing.

Referring to FIG. 10, a smart server 600 according to a second embodiment of the present invention includes a home power information receiving unit 610, an external power information receiving unit 620 and a power information correcting/outputting unit 630.

The home power information receiving unit 610 receives home power information including a home generated power quantity (IG) (or an internally generated power quantity (IG)) and a home power demand (TD). In this case, the home generated power quantity (IG) can have the same concept of the internally generated power quantity (IG) described together with the smart server according to the first embodiment of the present invention. Meanwhile, the home power information receiving unit 610 can include the generated quantity detecting unit 120 described with reference to FIG. 2. And, the home power information receiving unit 610 can receive an internally generated power quantity detected by the generated quantity detecting unit 120.

Meanwhile, the home power demand (TD) is a total power quantity required for electronic devices or appliances and can have the concept similar to that of the former power demand (TD) described together with the first embodiment. In order to obtain the home power demand (TD), the home power information receiving unit 610 is able to include the demand obtaining unit 110 of the first embodiment or can receive the power demand (or the home power demand) obtained by the demand obtaining unit 110.

The external power information receiving unit 620 receives the external power information including external power price information (EP) from the network (e.g., a smart grid network). In this case, the external power price information (EP) is not just limited to a unit price (example of unit: won/kwh) that is an amount per unit power and is able to include an amount (example of unit: won) corresponding to a used power quantity for predetermined period.

The power information correcting/outputting unit 630 outputs external power information that s corrected based on the external power information received by the external power information receiving unit 620 and the home power information received by the home power information receiving unit 610. In this case, the corrected external power information can include a corrected external power price. In this case, like the external power price, the corrected external power price has the concept of including an amount as well as a unit price. The corrected external power information is delivered to the at least one or more smart devices 801, 802 and 803 shown in FIG. 9. And, the corresponding smart device is able to control a power based on the corrected external power information.

Figure 11:
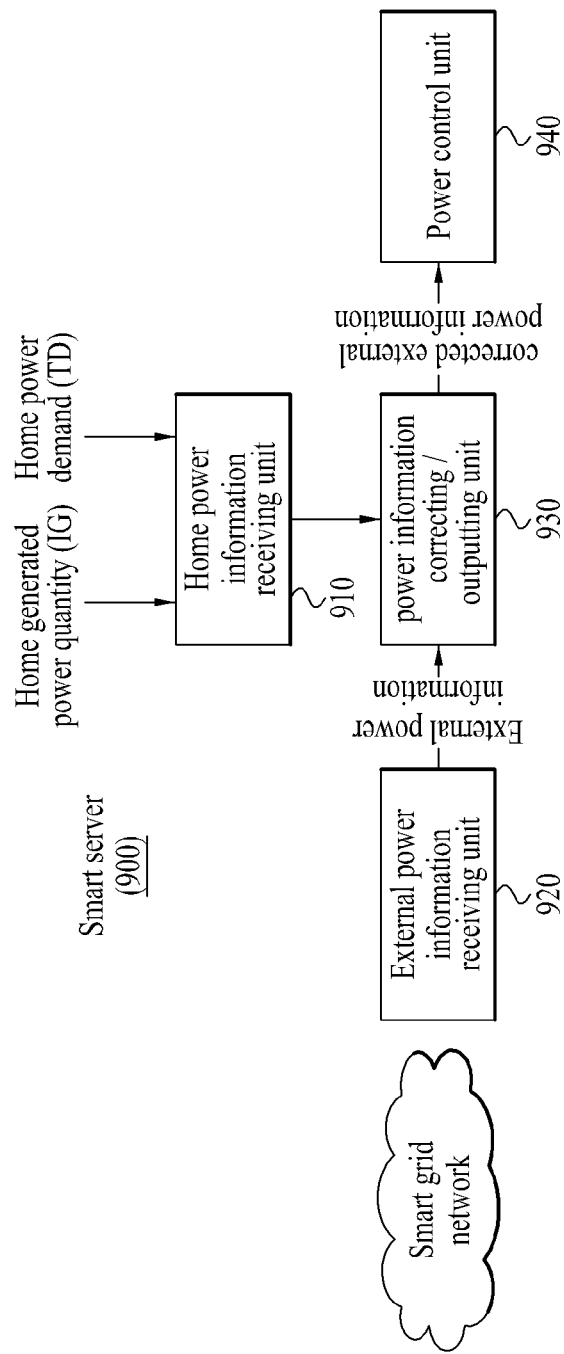
FIG. 11 is detailed block diagram of a smart device according to a second embodiment of the present invention.

FIG. 11 is detailed block diagram of a smart device according to a second embodiment of the present invention.

Referring to FIG. 11, a smart device 900 includes a home power information receiving unit 910, an external power information receiving unit 920 and a power information correcting/outputting unit 930 and is able to further include a power control unit 940.

In this case, the external power information receiving unit 920 receives external power information including price information of an external power from a smart server or via a network (e.g., a smart grid network).

Like the home power information receiving unit 610 of the former smart server, the home power information receiving unit 910 receives home power information including a home generated power quantity (IG) and a home power demand (TD).

The power information correcting/outputting unit 930 generates an external power information corrected based on the received external power information and the received home power information. In this case, the corrected external power information includes a price as well as a unit price.

And, the power control unit 940 controls a power based on the corrected external power information.

Figure 12:
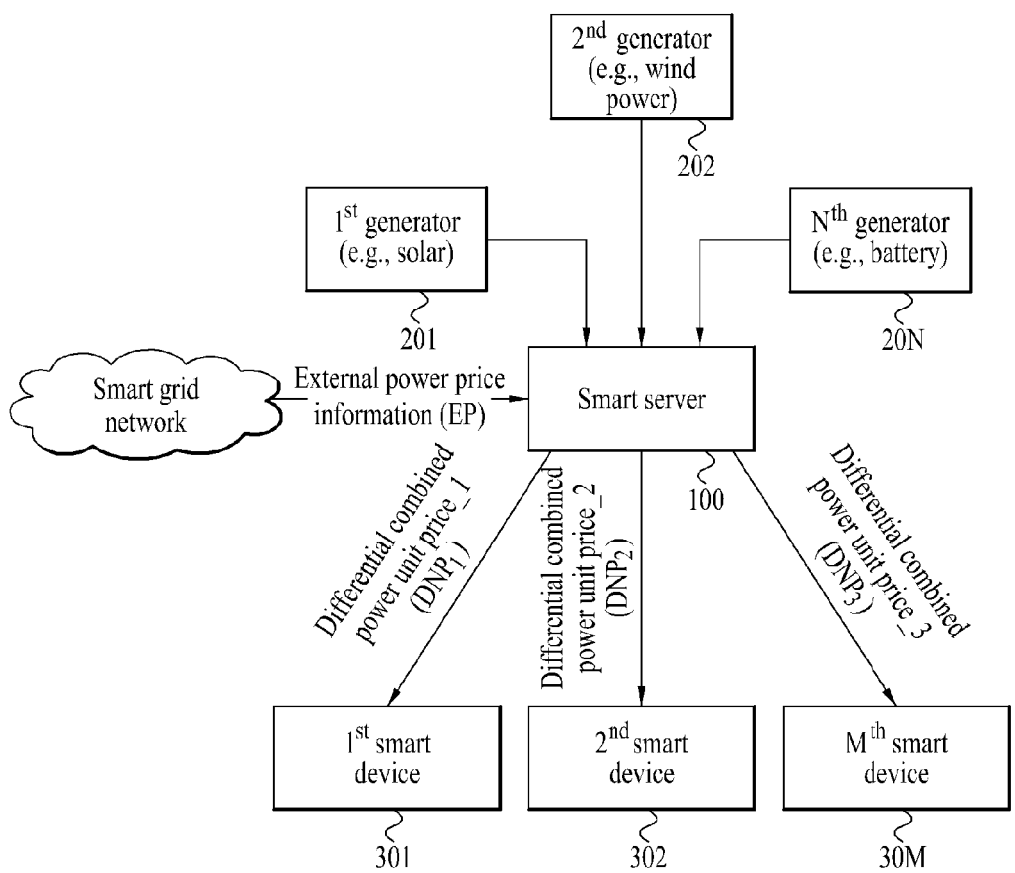
FIG. 12 is a block diagram of a smart server and peripheral devices according to a third embodiment of the present invention.
Figure 13:
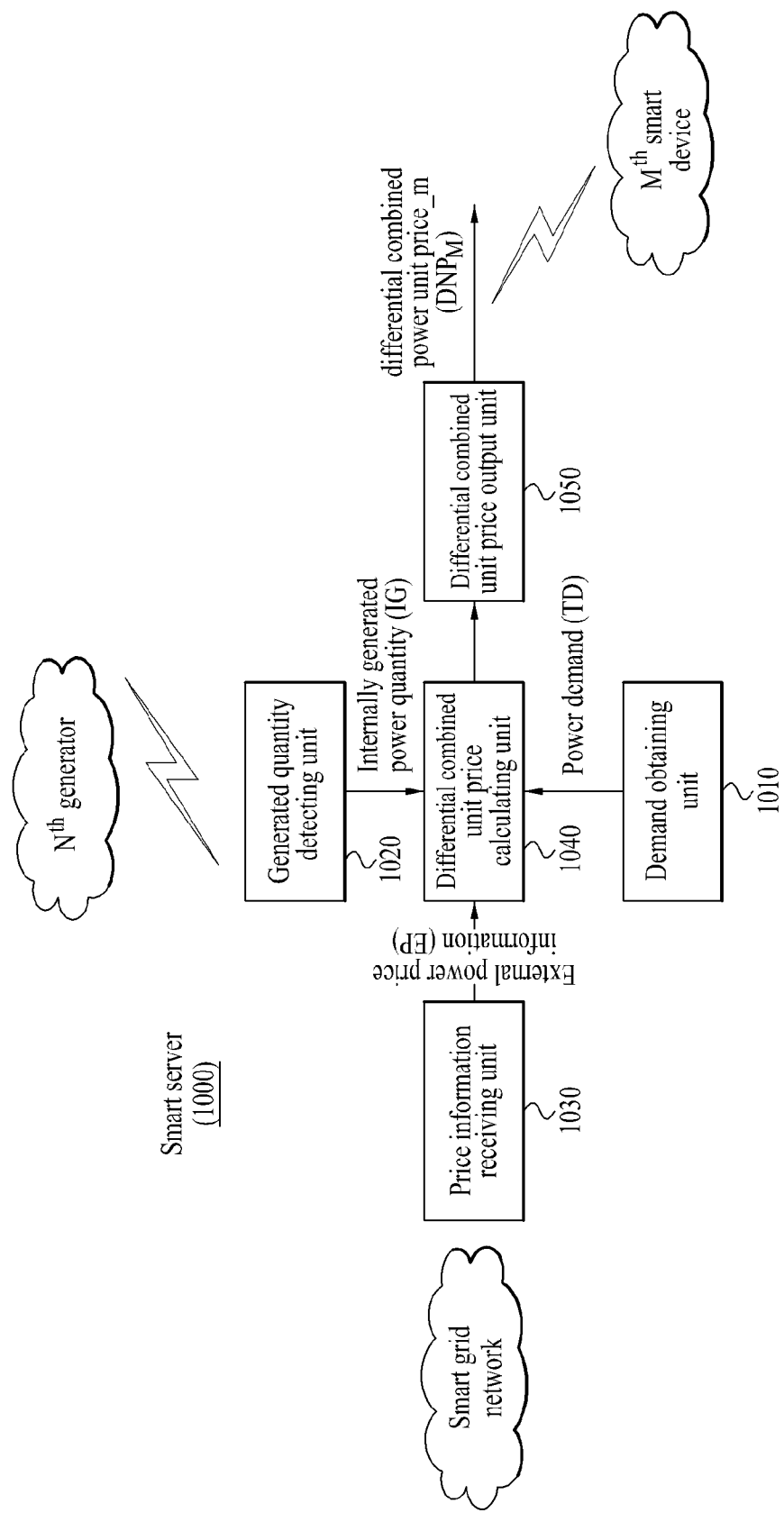
FIG. 13 is detailed block diagram of a smart server according to a third embodiment of the present invention.

FIG. 12 is a block diagram of a smart server and peripheral devices according to a third embodiment of the present invention, FIG. 13 is detailed block diagram of a smart server according to a third embodiment of the present invention, and FIG. 14 is a table for examples of a differential combined power unit price according to a third embodiment of the present invention. In the following description, a smart server according to a third embodiment of the present invention is explained with reference to FIGS. 12 to 14.

Referring to FIG. 12, like the former smart server 100 according to the first embodiment shown in FIG. 1, a smart server 1000 according to a third embodiment of the present invention is connected to a network (e.g., a smart grid network) and is also connected to at least one or more internal generators (i.e., first to $N^{th}$ generators 201 to 20N) installed at home and at least one or more smart devices (i.e., first to $M^{th}$ smart devices 301 to 30M).

Yet, unlike the former smart server 100 according to the first embodiment, the smart server 1000 transmits differential combined power unit prices $DNP_1$ to $DNP_M$ differing from one another to the smart devices 301 to 30M, respectively instead of transmitting the same combined power unit price (NP) to the smart devices 301 to 30M. The differential combined power unit prices shall be explained in detail with reference to FIG. 13 and FIG. 14 later.

Referring to FIG. 13, like the former smart server 100 according to the first embodiment, the smart server 1000 includes a demand obtaining unit 1010, a generated quantity detecting unit 1020 and a price information receiving unit 1030 and also includes a differential combined unit price calculating unit 1040 and a differential combined unit price output unit 1050.

Details of the demand obtaining unit 1010, the generated quantity detecting unit 1020 and the price information receiving unit 1030, which have the same names of the detailed components of the former smart server 100 according to the first embodiment, are omitted from the following description.

The differential combined unit price calculating unit 1040 calculates differential combined power unit prices in consideration of priorities of the smart devices 301 to 30M using an internally generated power quantity (IG), a power demand (TD) and an external power price information (EP). The differential combined unit price output unit 1050 delivers the differential combined power unit prices to the at least one or more smart devices, respectively.

FIG. 14 shows examples of a differential combined power unit price.

Referring to FIG. 14, such a smart device as a refrigerator is an appliance supposed to be driven all the time and can be set to have a small price sensitivity (i.e., an extent of power control according to a power price). In this case, it is able to calculate a differential combined power unit price in a manner of preferentially distributing an internally generated power quantity (IG) by setting a high priority. A first differential combined power unit price for a smart device having a high priority can be calculated by Formula 4. And, a second differential combined power unit price for a smart device having a lower priority can be calculated by Formula 5.

$$1^{st}\text{ Combined Power Unit Price}(DNP_1) = \text{External Power Unit Price}(EP) \times \{\text{Corrected Power Demand}(TD_1) - \text{Internally Generated Power Quantity}(IG)/\text{Power Demand}(TD), \text{ where Corrected Power Demand}(TD_1) = \text{Total Power Demand}(TD) - \text{Power Demand}(TD_L) \text{ of a smart device having a low priority.}$$ [Formula 4]

Namely, since an internally generated power quantity (IG) is preferentially assigned to a smart device having a high priority, a corrected power demand $TD_1$, which is calculated without consideration of a power demand $TD_L$ of a smart device having a low priority, is used.

For instance, if the power demand (TD) is 100 kwh, the internally generated power quantity (IG) is 15 kwh, the external power unit price (EP) is 100 won/kwh, and the power demand $TD_L$ of the smart device having the low priority is 30 kwh, the $1^{st}$ combined power unit price ($DNP_1$) is '100 won/kwh×(100 kwh−30 kwh−15 kwh)/100 kwh=100 won/kwh× 0.55=55 won/kwh'.

As the first differential combined power unit price is lower than the combined power unit price calculated by Formula 2, the smart device having the high priority recognizes that the power unit price is relatively cheap and is then able to use the power more reluctantly.

The following formula is provided to calculate a $2^{nd}$ differential combined power unit price for a smart device having a low priority.

$$2^{nd}\text{ Differential Combined Power Unit Price}(DNP_1) = \text{External Power Unit Price, if Power Demand }(TD) > \text{Internally Generated Power Quantity}(IG), \text{ or } = 0, \text{ if Power Demand}(TD) < \text{Internally Generated Power Quantity}(IG)$$ [Formula 5]

Formula 5 is provided to finally assign an internally generated power quantity (IG) to a device having a low priority. In case that a power demand (TD) for all devices is greater than an internally generated power quantity (IG), the internally generated power quantity (IG) is not assigned to the device having the low device but is assigned to the rest of devices. Hence, the device having the low priority uses an external power unit price (EP) as it is.

Meanwhile, a $3^{rd}$ differential combined power unit price for a smart device having an intermediate priority is calculated by the following formula.

$$3^{rd}\text{ Differential Combined Power Unit Price}(DNP_1) = \text{Combined Power Unit Price(Formula 2)}$$ [Formula 6]

If a smart device has an intermediate priority, an internally generated power quantity (IG) is equally distributed not preferentially or not finally. Therefore, a combined power unit price in Formula 2 is transmitted to the corresponding smart device to control a power.

Thus, an internally generated power quantity (IG) is differentially distributed according to a priority per device in a manner of providing a differential combined power unit price different per smart device. Therefore, a power control can be more efficiently performed. In this case, the priority is the information stored in a smart server. The priority includes a preset information or an information set by a user.

Figure 15:
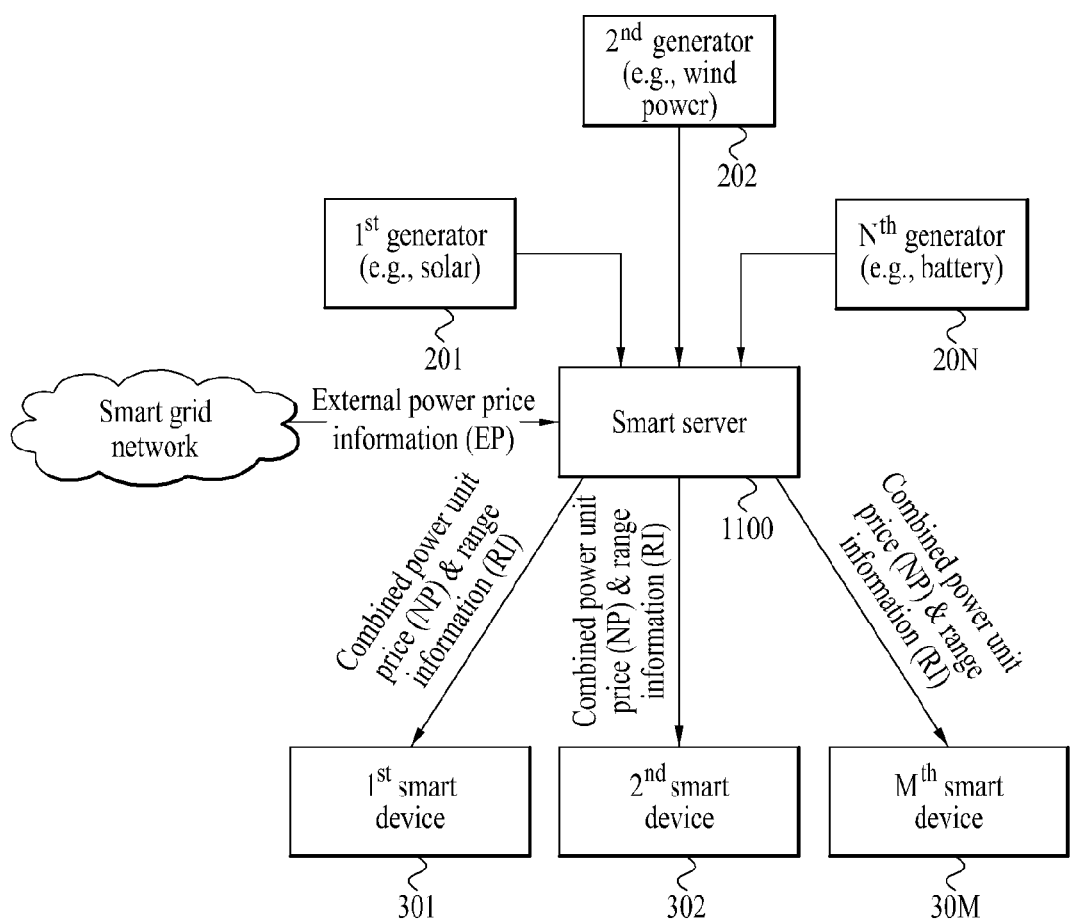
FIG. 15 is a block diagram of a smart server and peripheral devices according to a fourth embodiment of the present invention.
Figure 16:
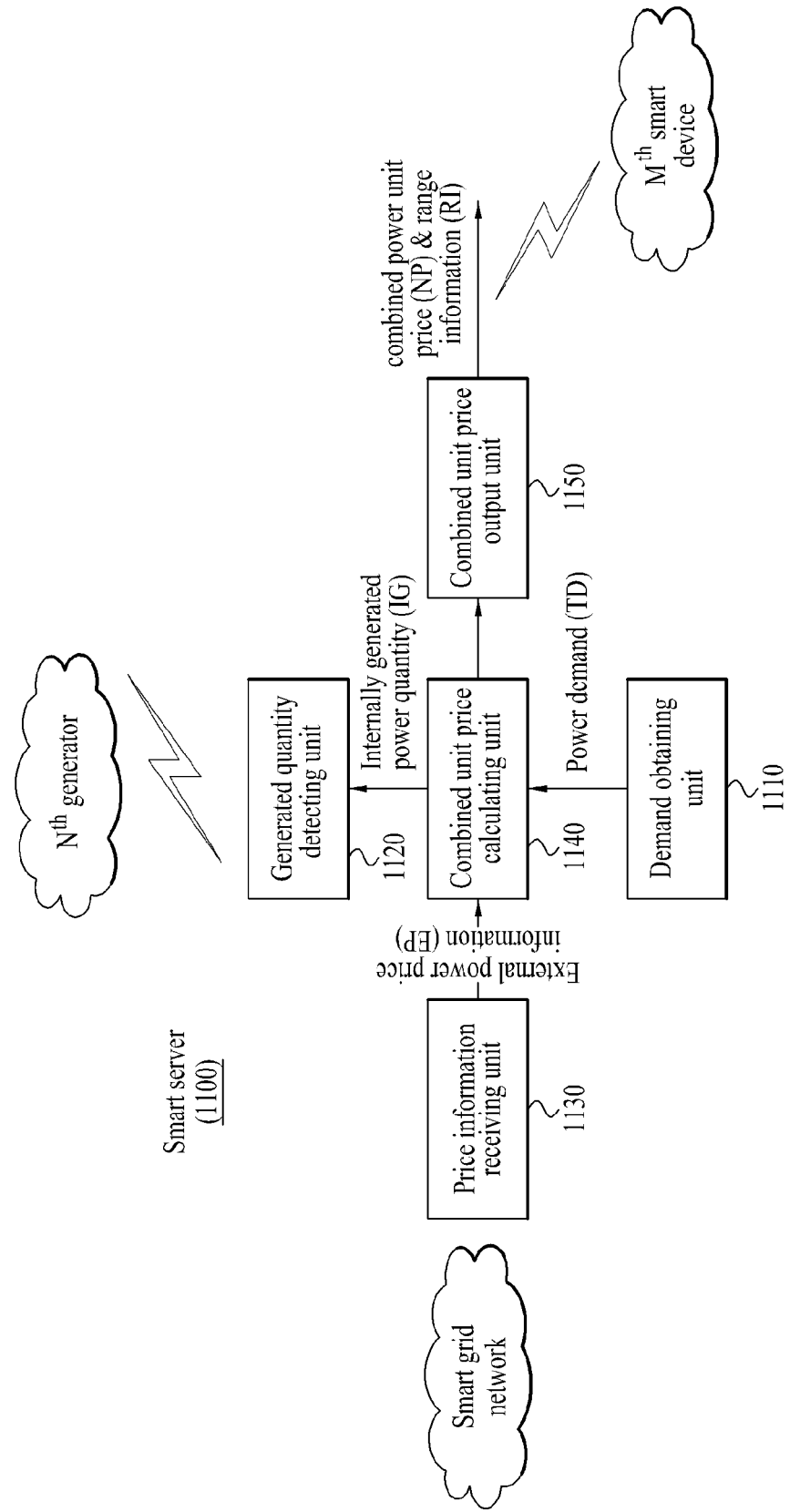
FIG. 16 is detailed block diagram of a smart server according to a fourth embodiment of the present invention.
Figure 17:
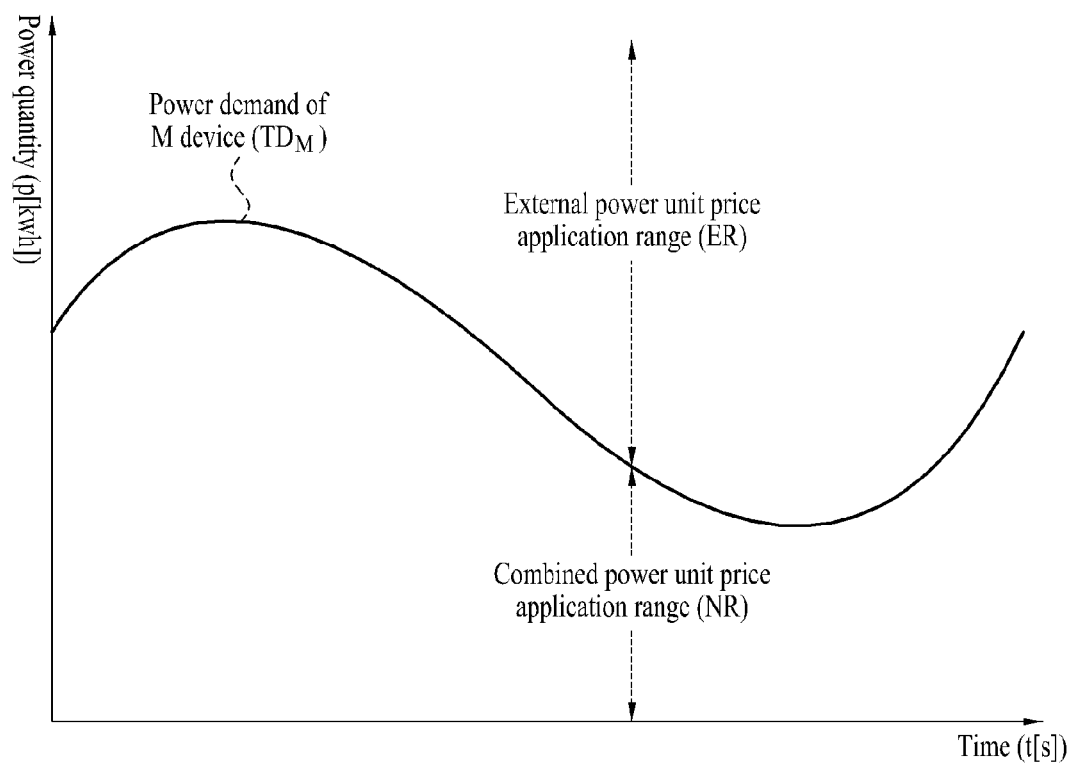
FIG. 17 is a graph for describing a power quantity range of a combined power unit price according to a fourth embodiment of the present invention.

FIG. 15 is a block diagram of a smart server and peripheral devices according to a fourth embodiment of the present invention, FIG. 16 is detailed block diagram of a smart server according to a fourth embodiment of the present invention, and FIG. 17 is a graph for describing a power quantity range of a combined power unit price according to a fourth embodiment of the present invention. In the following description, a fourth embodiment of the present invention is explained with reference to FIGS. 15 to 17.

Referring to FIG. 15, like the first embodiment of the present invention, a smart server 1110 is connected to a network and is also connected to at least one or more internal generators 201 to 20N and at least one or more smart devices 301 to 30M.

The smart server 1100 transmits a combined power unit price (NP) and range information (RI) to each of the smart devices 301 to 30M. In this case, the combined power unit price (NP) is the same information as explained in the foregoing description of the first embodiment. The range information (RI) is explained with reference to FIG. 16 and FIG. 17 as follows.

Referring to FIG. 16, like the first embodiment, the smart server 1100 includes a demand obtaining unit 1110, a generated quantity detecting unit 1120 and a price information receiving unit 1130, which perform the almost same functions of the components having the same names in the first embodiment, respectively. The details of the components of the smart server 1110 are omitted from the following description.

Like the first embodiment, a combined unit price calculating unit 1140 generates a combined unit price (NP) using an internally generated power quantity (IG), a power demand (TD) and an external power price information (EP). Moreover, the combined unit price calculating unit 1140 determines a power quantity range to which the combined power unit price (NP) is applied. And, the combined unit price calculating unit 1140 generates a range information (RI) indicating the corresponding range. The range information (RI) is explained with reference to FIG. 17 as follows.

Referring to FIG. 17, a power demand $TD_M$ for a specific smart device 30M is shown per time slot. This can include the data received from the $M^{th}$ smart device 30M by the demand obtaining unit 1110 of the smart server 1100.

In particular, the power demand $TD_M$ of the specific device obtained by the smart server 110 can correspond to an estimated use quantity reported to the smart server 1100 by the corresponding smart device 30M. In this case, the estimated use quantity can include the data in which a combined power unit price is not taken into consideration.

The smart device 30M receives the combined power unit price from the smart server 1100 and then controls a power based on the received combined power unit price. When the combined power unit price lies in a relatively cheap interval, it is misunderstood that a cheap combined power unit price is applied irrespective of a used power quantity. Therefore, it may happen that a power exceeding an estimated use quantity is used. In order to solve this problem or error, a range for applying a combined power unit price is determined and a power is then controlled according to the range.

Referring to FIG. 17, a region lower than a power demand $TD_M$ of a specific smart device is a range (NR) for applying a combined power unit price (NP). And, a region using a power more than a power demand is a range (ER) for applying an external power unit price (EP). Hence, the range information (RI) can include a power demand ($TD_M$) of an $M^{th}$ smart device and an external power unit price (EP). Since the power demand of the $M^{th}$ smart device may include the data self-calculated by the corresponding smart device, it can be excluded from the range information (RI).

According to the fourth embodiment of the present invention, a power quantity range for applying a combined power unit price (NP) is explicitly indicated to suppress an excessive use over the power quantity range, whereby a power control can be efficiently performed.

A price calculating method and a power control method according to the present invention can be implemented into a computer-executable program and can be stored in a computer-readable recording medium. And, multimedia data having a data structure of the present invention can be stored in the computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the data generated by the above mentioned method can be stored in the computer-readable recording medium or can be transmitted via wire/wireless communication network. In this case, the wire/wireless communication system is non-limited by a specific communication system.

Meanwhile, a smart server or device according to the present invention can be implemented by at least one processor.

Therefore, the present invention is applicable to manage and control a power.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of providing an adjusted power price information in a smart server, the method comprising:
receiving power information including an external power price for an external power generated at external power generators, via a network;
obtaining an internal power demand required for internal devices and obtaining an internal power generation quantity generated at internal power generators;
calculating, by a computer processor, an external power demand by subtracting the internal power generation quantity from the internal power demand and calculating, by the computer processor, an external power demand ratio by dividing the external power demand by the internal power demand;
generating, by the computer processor, a combined power price adjusting the external power price based on the calculated external power demand ratio; and
providing the combined power price to the internal devices instead of the external power price,
wherein the combined power price is used as a power control parameter at each internal device.

2. The method of claim 1, wherein the combined power price is calculated by multiplying the calculated external power demand ratio and the external power price.

3. The method of claim 1, wherein a lowest value of the combined power price is zero when the external power demand is equal to or smaller than zero.

4. The method of claim 1, wherein a highest value of the combined power price is equal to the external power price when the internal power generation quantity is equal to zero.

5. The method of claim 1, wherein the internal power demand is obtained by measuring an actual power consumption of the internal devices.

6. The method of claim 1, wherein the internal power demand is obtained by estimating a predicted power consumption of the internal devices.

7. The method of claim 1, wherein the internal power generation quantity is obtained by measuring an actual power generation of the internal power generators.

8. The method of claim 1, wherein the internal power generation quantity is obtained by estimating a predicted power generation of the internal power generators.

9. A smart server apparatus, comprising;
a receiver configured to receive power information including an external power price for an external power generated at external power generators, via a network;
a processor configured to generate a combined power price, the processor being configured to:
obtain an internal power demand required for internal devices and obtain an internal power generation quantity generated at internal power generators,
calculate an external power demand by subtracting the internal power generation quantity from the internal power demand and calculate an external power demand ratio by dividing the external power demand by the internal power demand, and
generate the combined power price adjusting the external power price based on the calculated external power demand ratio, and
a transmitter providing the combined power price to the internal devices instead of the external power price,
wherein the combined power price is used as a power control parameter at each internal device.

10. The smart server apparatus of claim 9, wherein the combined power price is calculated by multiplying the calculated external power demand ratio and the external power price.

11. The smart server apparatus of claim 9, wherein a lowest value of the combined power price is zero when the external power demand is equal to or smaller than zero.

12. The smart server apparatus of claim 9, wherein a highest value of the combined power price is equal to the external power price when the internal power generation quantity is equal to zero.

13. The smart server apparatus of claim 9, wherein the internal power demand is obtained by measuring an actual power consumption of the internal devices.

14. The smart server apparatus of claim 9, wherein the internal power demand is obtained by estimating a predicted power consumption of the internal devices.

15. The smart server apparatus of claim 9, wherein the internal power generation quantity is obtained by measuring an actual power generation of the internal power generators.

16. The smart server apparatus of claim 9, wherein the internal power generation quantity is obtained by estimating a predicted power generation of the internal power generators.

* * * * *